US005679140A

United States Patent [19]
McInerney et al.

[11] Patent Number: 5,679,140
[45] Date of Patent: Oct. 21, 1997

[54] MAGENTA AND YELLOW DYE SET FOR IMAGING SYSTEMS

[75] Inventors: Elizabeth McInerney; David Joseph Oldfield, both of Rochester, N.Y.

[73] Assignee: Eastman Kodak Company, Rochester, N.Y.

[21] Appl. No.: 699,956

[22] Filed: Aug. 20, 1996

[51] Int. Cl.$^6$ .................................................. C09D 11/16
[52] U.S. Cl. .................. 106/20 D; 106/20 R; 106/400; 106/401; 106/410; 106/495; 106/497; 106/498; 347/86; 358/502; 364/DIG. 2; 364/930.41
[58] Field of Search ................ 106/20 D, 20 R, 106/400, 401, 410, 495, 497, 498; 347/86; 358/502; 364/DIG. 2, 930.41

[56] References Cited

U.S. PATENT DOCUMENTS

| | | | |
|---|---|---|---|
| 4,758,885 | 7/1988 | Sasaki et al. | 358/80 |
| 4,765,838 | 8/1988 | Ohata et al. | 106/20 D |
| 4,818,285 | 4/1989 | Causley et al. | 106/20 D |
| 4,905,039 | 2/1990 | Terashita | 355/35 |
| 4,975,737 | 12/1990 | Murooka et al. | 355/77 |
| 5,143,547 | 9/1992 | Kappele | 106/22 |
| 5,145,519 | 9/1992 | Kappele | 106/20 D |
| 5,185,034 | 2/1993 | Webb et al. | 106/20 D |
| 5,200,667 | 4/1993 | Iwasaki et al. | 313/478 |
| 5,273,573 | 12/1993 | Kappele | 106/22 |
| 5,476,746 | 12/1995 | Janssens et al. | 430/200 |

OTHER PUBLICATIONS

Inui, M. "A Fast Algorithm for Computin Color Gamuts of Subtractive Colour Mixtures", J. Photog. Sci., 38, pp. 163, 164. Dec. 1990.

The Reproduction of Color, Hunt 5th Ed. pp. 177–192 (no date).

"The Color Gamut Obtainable by the Combination of Subtractive Color Dyes. Optimum Absorption Bands as Defined by Nonlinear Optimization Technique", J. Imaging Science, 30,9–12; by N. Ohta. (Feb. 1986).

"Brightness and Hue of Present–Day Dyes in Relation to Colour Photography" by M.E. Clarkson and T.Vickerstaff; Photo.J.88b, 26 (1948) (no month).

*Primary Examiner*—Mark L. Bell
*Assistant Examiner*—Scott L. Hertzog
*Attorney, Agent, or Firm*—Arthur E. Kluegel

[57] ABSTRACT

The invention provides a dye set comprising a magenta dye, a yellow dye, and a cyan dye wherein the normalized spectral transmission density distribution curve of the magenta dye has a density between 0.25 and 0.93 at 520 nm, a density between 0.9 and 1.0 at 540 nm, and a density between 0.9 and 1.0 at 560 nm and the yellow dye has a density between 0.9 and 1.0 at 450 nm and a density between 0.8 and 1.0 at 470 nm. Such a dye set enables an increase in the color gamut obtainable for imaging.

22 Claims, No Drawings

MAGENTA AND YELLOW DYE SET FOR IMAGING SYSTEMS

FIELD OF THE INVENTION

This invention relates to dye sets for imaging systems. More specifically, it relates to such dye sets employing a cyan dye together with a combination of a magenta dye and a yellow dye having particular transmittance spectra which increase the gamut of colors possible.

BACKGROUND OF THE INVENTION

Color gamut is an important feature of color printing and imaging systems. It is a measure of the range of colors that can be produced using a given combination of colorants. It is desirable for the color gamut to be as large as possible. The color gamut of the imaging system is controlled primarily by the absorption characteristics of the set of colorants used to produce the image. Subtractive imaging systems typically employ three or more colorants, typically including at least cyan, magenta, and yellow. It is also common for such systems to include an achromatic (neutral density) colorant such as black.

Images may comprise pictorial, graphic, or text or a composite of two or more of these as subjects. The ability to produce an image containing any particular color is limited by the color gamut of the system and materials used to produce the image. Thus when dyes are used in ink jet printing, dye transfer, etc., both image reproduction and the creation of original images are limited by the color gamut that the system and materials can produce.

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks employed may utilize either pigments or dyes as the colorants. In spite of the desire to maximize the color gamut obtainable from dye sets for ink jet printing, the results have not been all together satisfactory.

Color gamut is often thought to be maximized by the use of so-called "block dyes". In *The Reproduction of Colour* 4th ed., R. W. G. Hunt, pp 135–144, it has been suggested that the optimum gamut could be obtained with a subtractive three-color system using three theoretical block dyes where the blocks are separated at approximately 490 nm and 580 nm. This proposal is interesting but cannot be implemented for various reasons. In particular, there are no real colorants corresponding to the proposed block dyes.

Variations in the block dye concept are advanced by Clarkson, M., E., and Vickerstaff, T., in "Brightness and Hue of Present-Day Dyes in Relation to Colour Photography," Photo. J. 88b, 26 (1948). Three example shapes are given by Clarkson and Vickerstaff: Block, Trapezoidal, and Triangular. The authors conclude, contrary to the teachings of Hunt, that a trapezoidal absorption spectra may be preferred to a vertical sided block dye. Again, dyes having these trapezoidal spectra shapes are theoretical and are not available in practice.

Finally, both commercially available dyes and theoretical dyes were investigated in "The Color Gamut Obtainable by the Combination of Subtractive Color Dyes. Optimum Absorption Bands as Defined by Nonlinear Optimization Technique," J. Imaging Science, 30, 9–12. The author, N. Ohta, deals with the subject of real colorants and notes that the existing curve for typical magenta and yellow dyes, as shown in the publication, are the optimum absorption curves for those dyes from a gamut standpoint.

In spite of the foregoing teachings relative to color gamut, the dyes sets which have been employed for dye imaging have not provided the range of gamut desired for modern imaging. It is therefore a problem to be solved to provide a dye set including a magenta/yellow dye combination which enables an increase in color gamut over the gamut obtainable from the dye sets heretofore suggested for imaging.

SUMMARY OF THE INVENTION

The invention provides a dye set comprising a magenta dye, a yellow dye, and a cyan dye wherein the normalized spectral transmission density distribution curve of the magenta dye has a density between 0.25 and 0.93 at 520 nm, a density between 0.9 and 1.0 at 540 nm, and a density between 0.9 and 1.0 at 560 nm and the yellow dye has a density between 0.9 and 1.0 at 450 nm and a density between 0.8 and 1.0 at 470 nm. The invention further provides an ink jet cartridge comprising the specified dye set, an ink jet system having reservoirs containing the dye set, and a method of forming an image using the dye set.

The dye set of the invention provides increased color gamut compared to the dye sets heretofore available.

DETAILED DESCRIPTION OF THE INVENTION

The invention is summarized in the preceding section. The dye set of the invention employs subtractive color imaging. In such imaging, a color image is formed by generating a combination of cyan, magenta and yellow colorants in proportion to the amounts of exposure of red, green, and blue light respectively. The object is to provide a reproduction that is pleasing to the observer. In any event, every color in the reproduced image is composed of a combination of the cyan, magenta and yellow image colorants. The relationship of the original color to the reproduced color is a combination of many factors. It is, however, limited by the color gamut achievable by the multitude of combinations of cyan, magenta and yellow colorants used to generate the final image.

In addition to the individual colorant characteristics, it is necessary to have cyan, magenta and yellow colorants that have preferred absorption maxima relative to one another and that have absorption band shapes which function together to provide an optimum overall color gamut.

The CIELAB metrics, a*, b*, and L*, when specified in combination, describe the color of an object (under fixed viewing conditions), whether it be red, green, blue, etc. The measurement of a*, b*, and L* are well documented and now represent an international standard of color measurement. (The well known CIE system of color measurement was established by the International Commission on Illumination in 1931 and was further revised in 1971. For a more complete description of color measurement refer to "Principles of Color Technology, 2nd Edition by F. Billmeyer, Jr. and M. Saltzman, published by J. Wiley and Sons, 1981.)

Simply stated, a* is a measure of how green or magenta the color is (since they are color opposites) and b* is a measure of how blue or yellow a color is. From a mathematical perspective, a* and b* are determined as follows:

$$a^* = 500\{(X/X_n)^{1/3} - (Y/Y_n)^{1/3}\}$$

$$b^* = 200\{(Y/Y_n)^{1/3} - (Z/Z_n)^{1/3}\}$$

where X, Y and Z are the tristimulus values obtained from the combination of the visible reflectance spectrum of the object, the illuminant source (i.e. 5000° K.) and the standard observer function.

Simply stated, L* is a measure of how light or dark a color is. L*=100 is white. L*=0 is black. The value of L* is a function of the tristimulus value Y, thus $$L^* = 116(Y/Y_n)^{1/3} - 16$$

As used herein, the color gamut of a colorant set is the sum total of the nine slices of color space represented as the sum of a*–b* areas of 9L* slices (L*=10, 20, 30, 40, 50, 60, 70, 80, and 90) for the colorant or colorant set being tested. Color gamut may be obtained through measurement and estimation from a large sample of color patches (very tedious and time-consuming) or, as herein, calculated from the measured absorption characteristics of the individual colorants using the techniques described in J. Photographic Science, 38,163(1990).

The absorption characteristics of a given colorant will vary to some extent with a change in colorant amount (transferred density). This is due to factors such as a measurement flare, colorant-colorant interactions, colorant-receiver interactions, colorant concentration effects, and the presence of color impurities in the media. However, by using characteristic vector analysis (sometimes refereed to as principal component analysis or eigenvector analysis), one can determine a characteristic absorption curve that is representative of the absorption characteristics of the colorant over the complete wavelength and density ranges of interest. This technique is described by J. L. Simonds in the Journal of the Optical Society of America, 53(8),968–974 (1963).

The characteristic vector for each colorant is a two-dimensional array of optical transmission density and wavelength normalized to a peak height of 1.0. The characteristic vector is obtained by first measuring the reflection spectra of test images comprising patches of varying densities or percentage coverage of the colorant, including 100% coverage (Dmax) and 0% coverage (Dmin). The spectral reflection density of the Dmin is then subtracted from the spectral reflection density of each color patch. The resulting Dmin subtracted reflection densities are then converted to transmission density by passing the density data through the DR/DT curve. Characteristic vector analysis is then used to find one transmission density curve for each colorant which, when scaled in transmission density space, converted to reflection density, and added to Dmin, gives a best fit to the measured spectral reflectance data. This characteristic vector is used herein to both specify the spectral absorption characteristics of the colorant and to calculate the color gamut of each imaging system employing the colorant.

It is noted that the terms "pigment" and "dye" are often used as distinctions between different colorant types, but the distinction between the two is not always clear. For purposes of this specification, a pigment shall mean any dispersible solid particle colorant requiring a binder to adhere to a substrate. The term "dye" shall be deemed to include all colorants that are not pigments by this definition.

The spectra herein are considered to be yellow if they have a maximum absorbance between 400 and 500 nm, magenta if they have a maximum between 500 and 600 nm, and cyan if they have a maximum between 600 and 700 nm. The curve shape is a function of many factors and is not merely a result of the selection of a particular colorant compound. Further the spectral curve may represent the composite absorbance of two or more compounds. For example, if one particular compound provides the desired spectral curve, the addition of further compounds of the same color may provide a composite curve which remains within the desired range. Thus, when two or more colorants or dyes of a particular color are employed, the spectral curve for the "magenta", "yellow" or "cyan" colorant, for purposes of this invention, means the composite curve obtained from these two or more colorants.

Besides the chemical constitution of the dyes, the spectral curve of a given dye can be affected by other system components (solvents, surfactants, etc.). These parameters are selected to provide the desired spectral curve.

As noted in the Summary of the Invention, the magenta dye has a density between 0.90 and 1.0 at 560 nm, a density between 0.9 and 1.0 at 540 nm, and a density between 0.25 and 0.93 at 520 nm. In a preferred embodiment, the density is also between 0.25 and 0.86 at 510 nm and is desirably between 0.25 and 0.79 at 500 nm. The yellow dye of the invention has a density between 0.9 and 1.0 and 450 nm and between 0.8 and 1.0 at 470 nm. Desirably the yellow dye has a density between 0.5 and 0.9 at 490 nm as well.

Inks suitable for ink jet printing may be prepared from the dyes of the invention in the ways known to the art. U.S. Pat. Nos. 4,818,285; 5,143,547; 5,145,519; 5,185,034; and 5,273,573 provide guidance in this respect.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet dye sets comprising the three- or four- (including an achromatic, usually black, dye) member sets of dyes of the present invention can be used in any of the popular ink jet printing systems, including thermal or piezoelectric drop-on-demand printers and continuous ink jet printers. Of course, the specific ink formulations will vary depending upon the type of ink jet printing system.

The inks of the present invention are most advantageously used in conjunction with photographic quality ink jet paper, such as that manufactured and sold by the Eastman Kodak Company. This is because the optical density and color gamut are enhanced when the inks of the present invention are deposited on this type of paper. However, these inks will also be useful for printing on a variety of transparent and opaque films, and even on so-called plain papers.

Examples of suitable cyan dyes usable with the inventive combination typically have a density between 0.66 and 0.94 at 600 nm and between 0.83 and 1.0 at 610 nm. More desirably, the density is also between 0.33 and 0.9 at 580 nm and between 0.5 and 0.89 at 590 nm. See Table I.

EXAMPLES

The following examples will further illustrate the invention. The dyes are as identified in Table I.

TABLE 1

| Sample | Color | Description |
|---|---|---|
| $C_1$ | Cyan | Ohta optimum cyan colorant. |
| $C_2$ | " | Cyan Dye supplied by Epson America - item S020036, believed to be Direct Blue 86. |
| $C_3$ | " | Cyan Dye supplied by Emblem Co. - item 324000214810 |
| $C_4$ | " | Cyan Dye supplied by Lexmark Corp - item 1382060 believed to be Direct Blue 199. |
| $C_5$ | " | Cyan Dye supplied by Hewlett Packard Corp - item 51641A, believed to be Acid Blue 9. |
| $C_6$ | " | Cyan Dye supplied by Canon Inc. - item BJI-201-C |
| $MI_1$ | Magenta | Magenta Dye supplied by Epson America - item S020036, believed to be a quinacridone dye. |
| $MC_1$ | " | Ohta optimum magenta colorant |
| $MC_3$ | " | Magenta Dye supplied by Emblem Co. - item 324000213810 |
| $MC_4$ | " | Magenta Dye supplied by Lexmark Corp - item 1382060, believed to be composite of Acid Red 249 with dye from EP 592,774. |
| $MC_5$ | " | Magenta Dye supplied by Hewlett Packard Corp - item 51641A, believed to be Acid Red 35. |
| $MC_6$ | " | Magenta Dye supplied by Canon Inc. - item BJI-201-M |
| $YI_1$ | Yellow | Yellow Dye supplied by Hewlett Packard Corp - item 51641A, believed to be Acid Yellow 132. |
| $YC_1$ | " | Ohta optimum yellow colorant |
| $YC_2$ | " | Yellow Dye supplied by Epson America - item S020036, believed to be Direct Yellow 86. |
| $YC_3$ | " | Yellow Dye supplied by Emblem Co. - item 324000208810 |
| $YC_4$ | " | Yellow Dye supplied by Lexmark Corp - item 1382060, believed to be Direct Yellow 86. |
| $YC_6$ | " | Yellow Dye supplied by Canon Inc. - item BJI-201-Y |

In the Table, the first letter represents the color Cyan, Magenta, or Yellow. For the magenta and yellow samples, the second letter indicates Inventive or Comparative, where appropriate. The subscript indicates the sample number of that color and type. The usable cyan dyes included Direct and Acid Blue dyes as indicated; the inventive and comparative magenta pigments were quinacridone and "Acid Red" types; and the invnetive and comparative yellow dyes were Acid Yellow 132 and other Acid And Direct Yellow dyes. The normalized transmission densities of the dyes are shown in Tables IIA, IIB, and IIC.

The spectral absorption curve of each colorant was measured using a MacBeth Model 2145 Reflection Spectrophotometer having a Xenon pulsed source and a 10 nm nominal aperture. Reflection measurements were made over the wavelength range of 380-750 manometers using a measurement geometry of 45/0, and the characteristic vector (transmission density—vs—wavelength) for each dye specimen was calculated. The color gamuts resulting from using the characteristic vectors to calculate the gamut using the methods as described in J. Photographic Science, 38, 163 (1990) were determined and the results are given in Table III. Color gamuts are obtained by the above calculation method, assuming the use of "Heavy Weight Photographic Quality Ink Jet Paper" sold by Eastman Kodak Co, no light scatter, a D5000 viewing illuminant, and a Dmax of 2.2 status A. The same relative results are found if color gamuts are obtained by a different method and the optimal spectral regions hold true for any Dmin, any amount of flare, any Dmax and any viewing illuminant.

The inks to be tested were filtered through a 3 μm filter, and the filtrate was introduced into an ink jet printhead suitable for use in a Hewlett-Packard DeskJet® 540C ink jet printer. Test images comprising patches of varying densities or percentage coverages of the ink, including 100% coverage (Dmax) were printed on a glossy ink jet paper sold by Eastman Kodak Co. as "Heavy Weight Photographic Quality Inkjet Paper". These images were used to measure the distribution spectra.

Using this methodology, the various dyes tested had spectral curves having densities at the indicated wavelengths as shown in the following tables.

TABLE IIA

Magenta Density Values At Indicated Wavelength

| Magenta Dye | Type | D500 | D510 | D520 | D540 | D560 |
|---|---|---|---|---|---|---|
| | | Preferred Range | | Inventive Range | | |
| | | 0.25-0.79 | 0.25-0.86 | 0.25-0.93 | 0.9-1.0 | 0.9-1.00 |
| $MI_1$ | Inv | 0.37 | 0.56 | 0.79 | 1.0 | 0.99 |
| $MC_1$ | Comp | 0.59 | 0.74 | 0.88 | 1.0 | 0.85 |
| $MC_3$ | Comp | 0.37 | 0.51 | 0.69 | 0.82 | 1.0 |
| $MC_4$ | Comp | 0.75 | 0.85 | 0.94 | 0.95 | 1.0 |
| $MC_5$ | Comp | 0.55 | 0.67 | 0.80 | 0.89 | 1.0 |
| $MC_6$ | Comp | 0.78 | 0.89 | 0.97 | 0.97 | 1.0 |

Table IIA shows that only the magenta dye $MI_1$ falls within the inventive density range for 520, 540, and 560 nm. The inventive magenta also falls within the preferred ranges at 510 and 500 nm as well. None of the comparison dyes is within the prescribed range at 520, 540, and 560 nm.

TABLE IIB

Yellow Density Values At Indicated Wavelength

| Yellow Dye Preferred Ranges | Density at 450 nm | Density at 470 nm | Density at 490 nm Preferred |
|---|---|---|---|
| | Inventive Range | | |
| | 0.9-1.0 | 0.8-1.0 | 0.5-0.9 |
| $YI_1$ | 0.96 | 0.87 | 0.56 |
| $YC_1$ | 1.0 | 0.78 | 0.43 |
| $YC_2$ | 0.81 | 0.45 | 0.16 |
| $YC_3$ | 0.90 | 0.64 | 0.31 |
| $YC_4$ | 0.79 | 0.5 | 0.24 |
| $YC_5$ | 0.92 | 0.66 | 0.33 |

Table IIB shows that only the inventive yellow dye is within the density range of the invention at 450 and 470 nm.

TABLE IIC

Cyan Density Values At Indicated Wavelength

| Cyan Dye | D580 | D590 | D600 | D610 |
|---|---|---|---|---|
| $C_1$ | 0.42 | 0.51 | 0.62 | 0.74 |
| $C_2$ | 0.47 | 0.61 | 0.75 | 0.81 |
| $C_3$ | 0.66 | 0.77 | 0.85 | 0.91 |
| $C_4$ | 0.67 | 0.78 | 0.87 | 0.91 |
| $C_5$ | 0.64 | 0.74 | 0.83 | 0.90 |
| $C_6$ | 0.67 | 0.77 | 0.85 | 0.88 |

TABLE III

Color Gamut Values

| Sample | Type | Colorant Set | Gamut - Color Space Volume |
|---|---|---|---|
| 1 | Comp | $C_2/MI_1/YC_2$ | 73,426 |
| 2 | Comp | $C_2/MC_1/YC_1$ | 54,936 |
| 3 | Inv | $C_2/MI_1/YI_1$ | 82,958 |

TABLE III-continued

Color Gamut Values

| Sample | Type | Colorant Set | Gamut - Color Space Volume |
|---|---|---|---|
| 4 | Comp | $C_3/MC_3/YC_3$ | 70,234 |
| 5 | Comp | $C_3/MC_1/YC_1$ | 51,947 |
| 6 | Inv | $C_3/MI_1/YI_1$ | 78,504 |
| 7 | Comp | $C_4/MC_4/YC_4$ | 55,567 |
| 8 | Comp | $C_4/MC_1/YC_1$ | 48,891 |
| 9 | Inv | $C_4/MI_1/YI_1$ | 74,133 |
| 10 | Comp | $C_5/MC_5/YI_1$ | 65,661 |
| 11 | Comp | $C_5/MC_1/YC_1$ | 48,055 |
| 12 | Inv | $C_5/MI_1/YI_1$ | 72,954 |
| 13 | Comp | $C_6/MC_6/YC_6$ | 58,341 |
| 14 | Comp | $C_6/MC_1/YC_1$ | 49,360 |
| 15 | Inv | $C_6/MI_1/YI_1$ | 74,776 |
| 16 | Comp | $C_4/MC_4/YC_4/B_4$ | 59,019 |
| 17 | Comp | $C_4/MC_1/YC_1/B_4$ | 52,038 |
| 18 | Inv | $C_4/MI_1/YI_1/B_4$ | 79,853 |

In Table III, the color gamut values were obtained using the magenta and yellow dye combinations commercially employed by five different suppliers of ink jet dyes (subscript 2 through 6). For each of the commercial combinations using a cyan dye, either the comparative ink jet supplier's magenta/yellow dye combination, the magenta/yellow combination of the Ohta publication cited in the background (subscript 1)), or the inventive magenta and/or yellow($MI_1$, $YI_1$) were alternatively employed with the particular cyan dye and the gamut was determined. The data of Table III show that for each comparison, the inventive magenta/yellow colorant combination provided a superior gamut. The first sample in each set represents the suppliers current combination of cyan, magenta and yellow dyes. The samples employing magenta and yellow dyes with the $C_1$ designation represent a substitution of the "optimum" colorant of the Ohta publication for the colorant of the supplier. The gamut values resulting from using the Ohta optimum dyes in samples 2, 5, 8, 11, 14, and 17 are poor compared to the other values. In samples 1 and 10, either the inventive magenta or the inventive yellow dye are used but not both. When the results are compared to the conjoint use of both inventive dyes in samples 3 and 12, respectively, it is clear that the combination of the invention is superior.

Sample 18 shows the effect of including a black dye (Lexmark 1382050, believed to be a composite of Food Black 2 and dyes described in EP 592,774) in the set. Compared to Samples 7 and 9, improved results are obtained.

The entire contents of the various patent applications, patents and other publications referred to in this specification are incorporated herein by reference.

What is claimed is:

1. A dye set comprising a magenta dye, a yellow dye, and a cyan dye wherein the normalized spectral transmission density distribution curve of the magenta dye has a density between 0.25 and 0.93 at 520 nm, a density between 0.9 and 1.0 at 540 nm, and a density between 0.9 and 1.0 at 560 nm and the yellow dye has a density between 0.9 and 1.0 at 450 nm and a density between 0.8 and 1.0 at 470 nm.

2. The dye set of claim 1 wherein the spectral curve of the magenta dye also has a density between 0.25 and 0.86 at 510 nm.

3. The dye set of claim 2 wherein the spectral curve of the magenta dye also has a density between 0.25 and 0.79 at 500 nm.

4. The dye set of claim 1 wherein the spectral curve of the yellow dye also has a density between 0.5 and 0.9 at 490 nm.

5. The dye set of claim 1 additionally comprising an achromatic dye.

6. The dye set of claim 2 additionally comprising an achromatic dye.

7. The dye set of claim 3 additionally comprising an achromatic dye.

8. The dye set of claim 4 additionally comprising an achromatic dye.

9. The dye set of claim 1 wherein the cyan dye has a density between 0.66 and 0.94 at 600 nm and between 0.83 and 1.0 at 610 nm.

10. The dye set of claim 9 wherein the cyan dye additionally has a density between 0.5 and 0.89 at 590 nm.

11. The dye set of claim 10 wherein the cyan dye additionally has a density between 0.33 and 0.83 at 580 nm.

12. The dye set of claim 9 additionally comprising an achromatic dye.

13. An ink jet cartridge comprising an ink jet dye set in accordance with claim 1.

14. An ink jet cartridge comprising an ink jet dye set in accordance with claim 2.

15. An ink jet cartridge comprising an ink jet dye set in accordance with claim 3.

16. An ink jet cartridge comprising an ink jet dye set in accordance with claim 4.

17. An ink jet cartridge comprising an ink jet dye set in accordance with claim 5.

18. An ink jet cartridge comprising an ink jet dye set in accordance with claim 6.

19. An ink jet cartridge comprising an ink jet dye set in accordance with claim 7.

20. An ink jet cartridge comprising an ink jet dye set in accordance with claim 8.

21. An ink jet printing system comprising reservoirs containing the dye set of claim 1.

22. An ink jet printing system comprising reservoirs containing the dye set of claim 5.

* * * * *